United States Patent [19]

Hara

[11] 4,193,662
[45] Mar. 18, 1980

[54] BROADBAND SWITCHING SYSTEM UTILIZING OPTICAL FIBER WAVEGUIDES

[75] Inventor: Elmer H. Hara, Ottawa, Canada

[73] Assignee: Her Majesty the Queen in right of Canada, as represented by the Minister of National Defence, Ottawa, Canada

[21] Appl. No.: 928,123

[22] Filed: Jul. 26, 1978

[30] Foreign Application Priority Data

Aug. 9, 1977 [CA] Canada ............................ 284353

[51] Int. Cl.² ................................................ G02B 5/14
[52] U.S. Cl. ............................ 350/96.15; 335/4; 335/113; 335/114; 335/126; 350/96.20; 361/174
[58] Field of Search .............. 350/96.15, 96.16, 96.20, 350/96.21, 96.22; 335/4, 113, 114, 126; 340/147 C, 147 CN; 361/174, 179; 250/227

[56] References Cited

U.S. PATENT DOCUMENTS

| 4,088,387 | 5/1978 | Lewis | 350/96.15 |
| 4,124,271 | 11/1978 | Green | 350/96.20 |

FOREIGN PATENT DOCUMENTS

| 1946693 | 8/1970 | Fed. Rep. of Germany | 350/96.20 |
| 2016498 | 10/1971 | Fed. Rep. of Germany | 350/96.20 |
| 2651776 | 5/1977 | Fed. Rep. of Germany | 350/96.20 |

Primary Examiner—John K. Corbin
Assistant Examiner—John D. Lee
Attorney, Agent, or Firm—Nathan Edelberg; Jeremiah G. Murray; Edward Goldberg

[57] ABSTRACT

The present invention relates to an optical-fiber switch. The switch is used in switching between at least two optical signals which are capable of being modulated with a broadband RF signal including digital signals. The switch is comprised of at least two optical-fiber cables for feeding the at least two optical signals to at least two fixed positions. An optical-fiber output cable is provided having one end which is movable between at least two positions which are directly adjacent said two fixed positions. A drive unit is provided for moving the optical-fiber output cable between the at least two positions, whereby the optical signals are selectively fed to the optical-fiber output cable.

13 Claims, 3 Drawing Figures

BROADBAND SWITCHING SYSTEM UTILIZING OPTICAL FIBER WAVEGUIDES

BACKGROUND OF THE INVENTION

The present invention relates to an optical-fiber switch for switching broadband radio frequency signals, particularly telephone and television signals.

DESCRIPTION OF THE PRIOR ART

The switching of broadband radio frequency signals such as those occurring in cable television systems is difficult because of the radio frequency leakage across, and in the neighbourhood of the switching point. This leakage produces undesirable interferences such as crosstalk and degrades the transmitted signal.

Semiconductor devices such as transistors and diodes can be used in constructing switches for radio frequency signals such as baseband television. However, when such switching units are used at higher frequencies such as that for channel 2-of of the TV broadcasting band, RF leakage becomes an acute problem because the leakage is a function of frequency.

Mechanically operated coaxial cable switches function satisfactorily for most cases but since the leakage is a function of frequency, at frequencies above 50 MHz leakage is a problem for a number of coaxial cable switch designs. Such switches are phyiscally large in comparison to semiconductor switches. Electromechanically operated reed switches also suffer from such leakage problems at high frequencies.

Such coaxial switches and electronic switches have an isolation of typically more than 60 dB at frequencies below 50 MHz. However, at 50 MHz and above, this isolation degrades and at 300 MHz the isolation becomes less than 40 dB in many cases. In order to properly switch a television signal, an isolation of at least 60 dB is required. Generally speaking, many switches available to date to not provide good isolation, i.e. 90 dB or better above 100 MHz.

The performance of certain switching systems, such as transistor and diode switching systems, and even coaxial switching systems, are frequency dependent. In other words isolation and insertion loss through the switching unit is a function of the frequency being switched. As a result, in many cases when broadband switching is attempted, awkward frequency compensation devices must be employed in conjunction with the switch in order to compensate for this frequency dependent isolation and insertion loss characteristic.

SUMMARY OF THE INVENTION

The present invention contemplates the use of an optical carrier frequency in the neighbourhood of $10^{14}$ Hz. This optical carrier has modulated thereon the broadband RF signal to be switched. A plurality of optical carrier signals are provided, each modulated with an appropriate RF signal. Each modulated optical carrier is fed to the switching unit via an optical-fiber waveguide or a bundle of optical-fiber waveguides. Each optical-fiber waveguide or bundle is terminated in a fixed position. A movable optical-fiber waveguide or bundle is used as the output. This movable optical-fiber waveguide or bundle is moved to a plurality of fixed positions, each being located directly adjacent a fixed position of the optical-fiber input waveguide or bundle.

By using high quality optical-fiber waveguides or bundles of such fibers and by carefully orienting the movable optical-fiber waveguide or bundle of such fibers with respect to each of the input optical-fiber waveguide or bundle of such fibers, isolation of over 100 dB can be obtained with an insertion loss of less than 3 dB.

Precision positioning of the optical-fibers is sometimes required, particularly if single optical-fiber waveguides are used instead of optical-fiber waveguide bundles. This can be achieved by mechanical or photo-electronic devices such as mechanical detents or interferometric position sensors.

The optical waveguide allows good isolation of unconnected circuits. The isolation can be improved even more by placing light absorbing material in suitable strategic locations.

It should be noted that no physical contact between the optical-fiber input and the optical-fiber output means is required, although their separation should be minimized to maintain a low insertion loss. As a result there will be no contact deterioration with use.

It is an object of the present invenion to provide an optical switch capable of handling light signals which are modulated with television bands.

It is a further object of the present invention to provide a simple, compact optical light switch which provides good isolation at TV broadcast frequencies and which provides low insertion loss.

In accordance with one aspect of the present invention there is provided an optical-fiber switch for use in switching between at least two signals which are capable of being modulated with a broadband RF signal. The optical-fiber switch is comprised of at least two optical-fiber means for feeding said at least two optical signals to at least two fixed positions; an optical-fiber output means having one end which is movable between at least two positions which are directly adjacent said two fixed positions; and drive means for moving said optical-fiber output means between said at least two positions, whereby said optical signals are selectively fed to said optical-fiber output means.

BRIEF DESCRIPTION OF THE DRAWINGS

In the drawings which illustrate embodiments of the invention.

DESCRIPTION OF PREFERRED EMBODIMENTS

Figure 1:
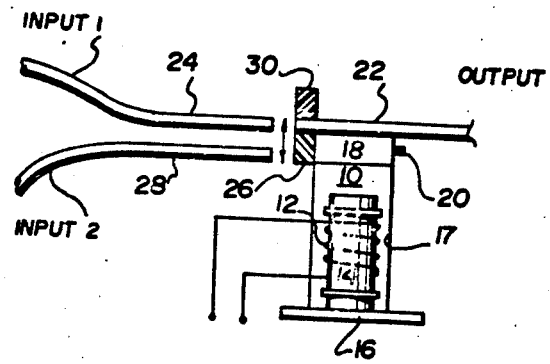
FIG. 1 is a schematic diagram of a particular embodiment according to the present invention.

FIG. 1 illustrates a simple single-pole double-throw optical-fiber waveguide switch. A simple electromagnet 10 is comprised of an energizable coil 12 and a pole piece 14. The pole piece is mounted on a base 16. An armature 18 is pivotally mounted at 20 on a vertically positioned stand 17. The armature 18 is biased away from the pole piece 14 by a spring not shown.

When the coil 12 is deenergized the switch is in the configuration shown in FIG. 1. Output optical-fiber waveguide 22 is oriented directly in line with input 1 comprised of optical-fiber waveguide 24. In this position a light absorbing block 26 is located directly in front of the end of input 2 consisting of optical-fiber waveguide 28. This light absorbing material located in this position improves the isolation between inputs 24 and 28. When the electro-magnet 10 is energized the armature is urged towards the pole piece against the force of the biasing spring (not shown) and the optical-fiber waveguide output 22 is oriented directly in line with the second input waveguide 28. Activation and deactivation of the solenoid moves the output waveguide 22 in the direction of the arrow.

When the electro-magnet 10 is energized and output waveguide 22 is oriented in line with input waveguide 28 light absorbing material 30 is positioned directly in front of the end of fiber optic waveguide 24. Again, this movement of the light absorbing material in front of the unconnected input provides improved isolation between the inputs.

Figure 2:
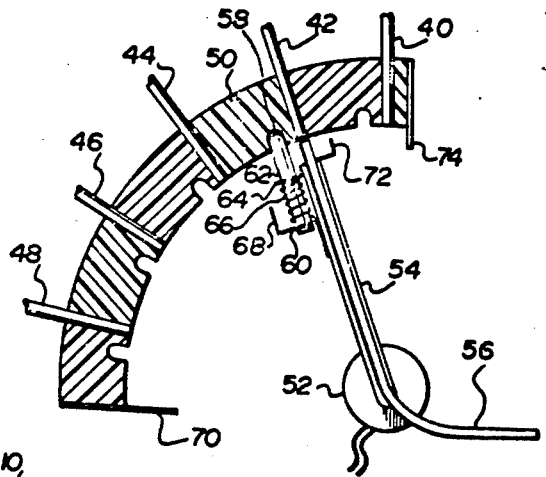
FIG. 2 is a schematic diagram of another embodiment of the present invention providing a rotary-type switching arrangement.

FIG. 2 illustrates, in a schematic way, a second embodiment of a switch according to the present invention. The drive for this switch is a known type of stepping relay which is often used in telephone exchanges. In FIG. 2 five input optical-fiber waveguides 40, 42, 44, 46 and 48 are shown. However, it should be understood that the invention is not limited to switching between five such inputs.

The five optical-fiber input waveguides mentioned above are mounted in a positioning block 50. The rotary stepping relay 52 moves a radial arm support 54 in a circular manner. An optical-fiber waveguide output element 56 is fixed to radial arm 54. In operation the end of waveguide 56 is moved so that in its quiescent state it is located directly adjacent the end of one of the optical-fiber input waveguides 40, 42, 44, 46 or 48.

In order to align the output waveguide with any one of the input waveguides, a mechanical detent is positioned in the positioning block 50 besides each of the input optical-fiber waveguides. One such detent is shown at 58 beside optical-fiber waveguide input 42. A combination detent support holder and stop 60 is mounted on one side of radial arm 54. This holder 60 is provided with a hole for accepting detent stop 62. Detent stop 62 has secured to its body portion a washer 64. A spring 66 urges against holder 60 and washer 64 to force the detent stop against block 50 thereby positioning the detent stop in the various detents including detent 58. Detent stop 62 is provided with one rounded end which facilitates movement in and out of the detents and movement along the interior surface of the block 50. This arrangement of detents positions the output optical-fiber waveguide in direct alignment with a selected one of the input optical-fiber waveguides.

Detent support holder 60 is also provided with a stop 68. This stop 68 comes into contact with a stopper arm 70 located at one end of block 50. This arrangement merely prevents the radial arm and its detent mechanism from overshooting the end of the switch. Similarly, radial arm 54 is provided on its opposite side with a stop 72 which contacts a stopper 74 located on the other end of block 50.

Figure 3:
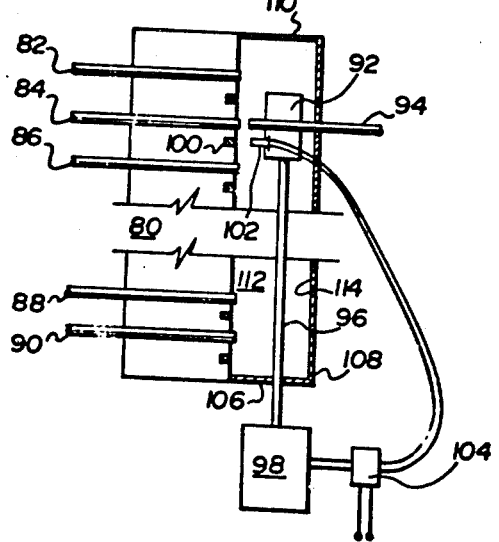
FIG. 3 is a schematic diagram of yet another embodiment of the present invention showing a linear switching arrangement.

FIG. 3 of the drawings shows an optical-fiber waveguide switch configured in a linear manner. Block 80 positions input optical-fiber waveguides 82, 84, 86, 88 and 90. It should be noted that although FIG. 3 shows five inputs, the invention is not limited to these five inputs. A carriage block 92 holds the output optical-fiber waveguide 94. A mechanical linkage 96 connects the block 92 to a linear driving device 98. This driving device can either be a ratchet type relay or a linear motor. If a ratchet type relay is employed, then precise alignment of optical-fiber waveguides can be accomplished by the precise movement of the relay. If a linear motor is employed, then it is necessary to provide either a mechanical detent arrangement as was shown in FIG. 2 or an optoelectronic alignment system. FIG. 3 shows such a system. Light emitting sources are provided in block 80 beside each input optical-fiber waveguide. One such light source is indicated at 100. A photosensitive element 102 is mounted on block 92. The output of the photosensitive element 102 controls a switch 104 which in turn controls the operation of linear motor 98. This arrangement provides for the precise alignment necessary to obtain both good insolation and low insertion loss.

The inner wall of block 80 in conjunction with walls 106, 108 and 110 form a compartment 112. This compartment can be made liquid tight and can be filled with a matching oil. This matching oil improves the index of refraction between the ends of the individual input optical-fiber waveguides and the output optical-fiber waveguide 94. Use of this matching oil improves the insertion loss of the device.

A light absorbing material 114 is located on the interior side of wall 108. This light absorbing material improves the isolation between inputs.

It should be noted that in all of the embodiments described above, the device will operate equally well when the input and output functions of optical-fiber waveguides are interchanged. The waveguides mentioned above can be single optical-fibers or bundles of such fibers.

What is claimed is:

1. An optical-fiber switch for use in switching a plurality of optical signals which are capable of being modulated with a broadband radio frequency signal, said switch comprising:
   (a) a plurality of optical-fiber means for feeding respective optical signals to a plurality of fixed positions associated with respective optical-fiber means;
   (b) a further optical-fiber means having one end which is movable between a plurality of selective positions adjacent and facing said plurality of fixed positions;
   (c) driving means for moving said further optical-fiber means between said plurality of selective positions to selectively feed said optical signals between one of said plurality of optical-fiber means and said further optical-fiber means; and
   (d) a plurality of light emitting positioning means each located adjacent a respective one of said plurality of fixed positions, and a light sensitive element adjacent said further optical-fiber means to receive light from said light emitting means, said light sensitive element being associated with said driving means to selectively align said further optical-fiber means with one of said fixed positions associated with respective said light emitting positioning means.

2. The optical-fiber switch according to claim 1 wherein said driving means is an electromagnetic relay having a single-pole double-throw switch.

3. The optical-fiber switch according to claim 2, wherein light absorbing material is arranged directly in front of the other of said plurality of optical-fiber means that are not positioned to feed signals to said further optical-fiber means to reduce reflection between said plurality of optical-fiber means.

4. The optical-fiber switch according to claim 1 wherein said plurality of fixed positions are spaced radially about a first circumference of an outer circle, and including a radial arm pivotable about the center of said circle, said further optical-fiber means being an optical-fiber cable secured to said arm, said plurality of selective positions being disposed about a second inner circumference coaxial with and spaced closely to said first circumference, said further optical-fiber cable being selectively in radial alignment with one of said plurality of optical-fiber means.

5. The optical-fiber switch according to claim 4 wherein said driving means is a rotary stepping relay.

6. The optical-fiber switch according to claim 1 including a matching oil disposed between said plurality of optical-fiber means and said further optical-fiber means for matching the index of refraction of said optical-fiber means and to lower the insertion loss of said switch.

7. The optical-fiber switch according to claim 1 wherein said plurality of fixed positions are spaced along a linear path, and said further optical fiber means includes a block containing an optical-fiber cable, said driving means moving said cable and block lineraly to selectively align said end with one of said plurality of fixed positions.

8. The optical-fiber switch according to claim 7 wherein said drive means is a ratchet relay.

9. The optical-fiber switch according to claim 7 wherein said drive means is a linear motor.

10. The optical-fiber switch according to claim 1 wherein said driving means includes a power switch and said light sensitive element controls said power switch.

11. The optical-fiber switch according to claim 1 whereiin said optical-fiber means are single optical-fibers.

12. The optical-fiber switch according to claim 1 wherein said optical-fiber means are bundles of single optical-fibers.

13. The optical-fiber switch according to claim 1 wherein said further optical-fiber means is coupled selectively as an input means for an optical signal when said plurality of optical-fiber-means are coupled as output means and as an output means when said plurality of optical-fiber means are coupled as input means.

* * * * *